United States Patent [19]

Edwards et al.

[11] Patent Number: 4,684,929

[45] Date of Patent: Aug. 4, 1987

[54] MICROWAVE/SEISMIC SECURITY SYSTEM

[75] Inventors: Carson P. Edwards; Martin A. Huisjen; Robert E. Munson, all of Boulder, Colo.

[73] Assignee: Ball Corporation, Muncie, Ind.

[21] Appl. No.: 788,482

[22] Filed: Oct. 17, 1985

[51] Int. Cl.⁴ ............................................. G08B 13/00
[52] U.S. Cl. .................................. 340/541; 340/522; 340/566; 340/545
[58] Field of Search ............... 340/572, 522, 566, 541, 340/545

[56] References Cited

U.S. PATENT DOCUMENTS

| 3,509,791 | 5/1970 | Pechamat et al. | 340/522 |
| 3,518,546 | 6/1970 | Augneblick et al. | 455/19 |
| 3,573,817 | 4/1971 | Akers | 340/522 |
| 3,938,125 | 1/1976 | Benassi | 340/572 |
| 3,990,065 | 11/1976 | Purinton et al. | 340/551 |
| 4,092,636 | 5/1978 | Shepherd, Jr. | 340/545 |
| 4,139,844 | 2/1979 | Reeder | 340/572 |
| 4,274,089 | 6/1981 | Giles | 340/572 |
| 4,302,846 | 11/1981 | Stephen et al. | 340/572 |
| 4,303,910 | 11/1981 | McCann | 340/572 |
| 4,334,214 | 6/1982 | Satou et al. | 340/552 |
| 4,352,098 | 6/1982 | Stephen et al. | 340/572 |
| 4,368,460 | 1/1983 | Clinard et al. | 340/522 |
| 4,382,291 | 5/1983 | Nakauchi | 367/93 |

OTHER PUBLICATIONS

EAS: Playing Retail Tag by Thomas J. Serb, Security World, Jun. 1983, pp. 50-53.
Small Tags Protect Big Stores,-High Technology, Sep./Oct. 1982, pp. 16-17.
Love/Hate and Lots of Hassles, But . . . , by Pamela James, Security Management, Feb. 1981, 24-28 and 45-46.
More Than One Way to Catch a Thief, by Susan M. Rogers, Chain Store Age Executive, Apr. 1982-pp. 39 and 41.
Two-page summary report entitled, "What is on the Market Today."

Primary Examiner—Glen R. Swann, III
Attorney, Agent, or Firm—Gilbert E. Alberding

[57] ABSTRACT

Method and apparatus is disclosed for detecting a security threat in a zone. A transmitter within the zone directs a first microwave signal of frequency $f_0$ to a reflector. The reflector doubles the frequency to $2f_0$ and reradiates it to a receiver. The receiver correlates the reflected signal (phase and/or amplitude) with the transmitted signal and provides spectral data to a digital signal processor. A seismic sensor within the security zone also provides seismic spectral data to the digital signal processor whenever seismic disturbances are detected within the zone. The digital signal processor compares the spectral data with predetermined stored spectral data. Whenever both the reflector signal and the seismic signal spectra indicate a security threat within the zone, an alarm signal is output. Loss of reflector output plus adverse seismic spectral data may also trigger an alarm. The dual-sensor configuration reduces false alarms and circumvention of the detection system.

25 Claims, 4 Drawing Figures

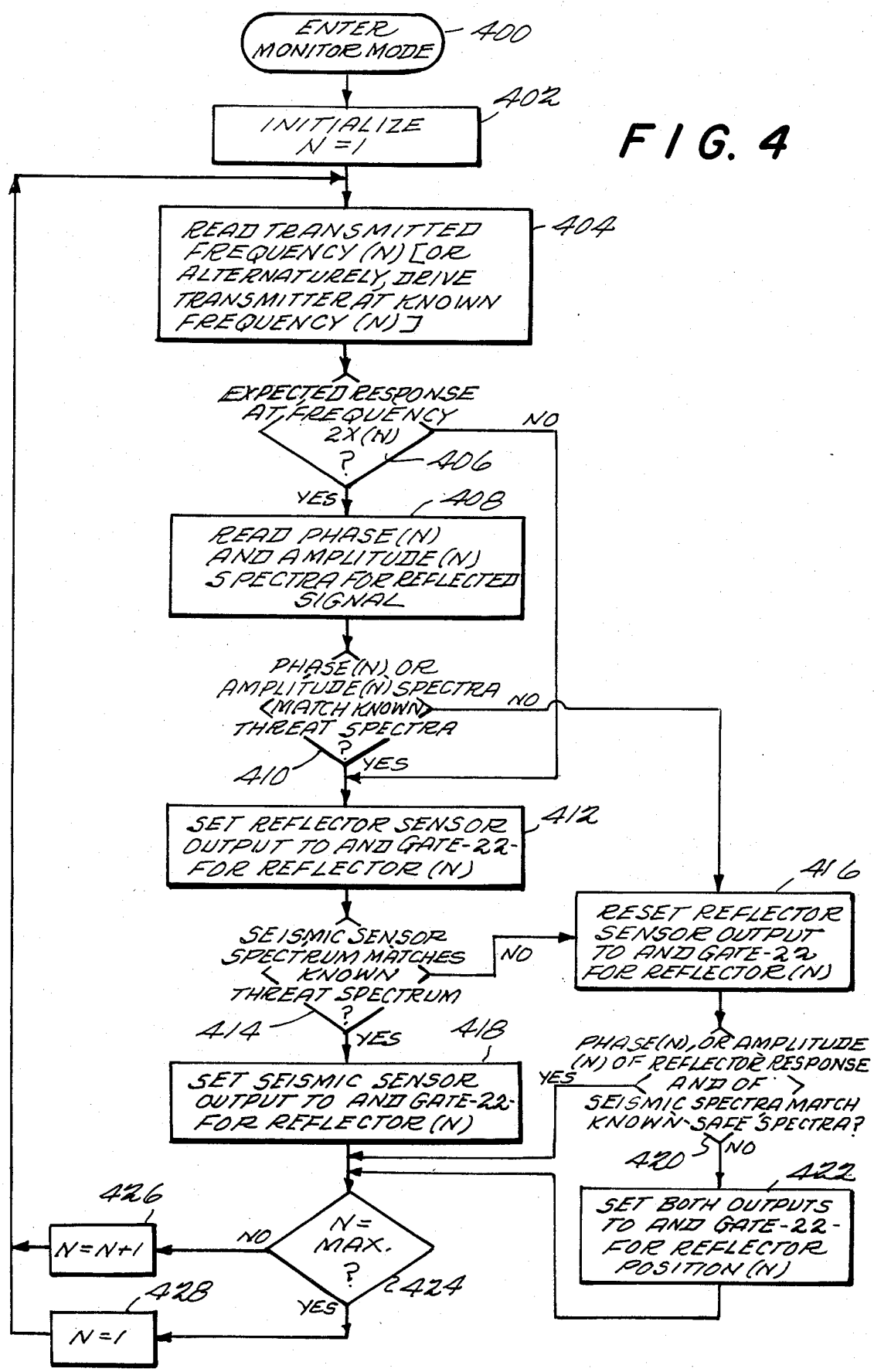

MICROWAVE/SEISMIC SECURITY SYSTEM

BACKGROUND OF THE INVENTION

This invention relates to apparatus and method for detecting a security threat within a given area. More particularly, it relates to a detection system wherein the spectra of microwave signals reflected from targeted reflectors and of locally detected seismic signals are compared with predetermined spectral signal patterns or "signatures" to detect the presence of a security threat.

Many systems are known for detecting the presence of a security threat. However, these systems typically are expensive and/or are prone to generating false alarm signals. In addition, most known systems are limited in range and often may be circumvented by disabling a portion of the system, masking the RF signals, counterfeiting RF signals, etc.

For example, U.S. Pat. No. 4,274,089 to Giles discloses a merchandise security system in which a passive tag is attached to a piece of merchandise. An RF signal is transmitted into the detection zone with a given frequency. A receiving antenna picks up RF signals generated in the detection zone and provides an alarm signal whenever RF signals of a specific frequency are detected in the zone. The tag on the merchandise contains circuitry for receiving the transmitted signal at frequency f, doubling its frequency, and retransmitting a signal of frequency 2f. When the receiving antenna picks up the retransmitted 2f signal, an alarm signal is generated. Such a prior system apparently was limited in effectiveness to 1–3 meters (see column 4, lines 35 and 50) and is inherently subject to false alarms e.g. since the receiving antenna will produce an alarm signal whenever a signal with the doubled frequency is received). Another RF transmitter or an inadvertent reflective device inside the detection zone can also cause a false alarm. In addition, since the RF signal transmitted into the detection zone is not transmitted with any directivity, it is possible for this RF signal to be reflected by any reflector within the zone. Thus, if more than one tag is present in the zone, the system only detects one security threat.

Another known security detection system is described in U.S. Pat. No. 4,302,846 to Stephen et al. Stephen discloses a marker tag detection system similar to that described in Giles. However, Stephen transmits signals of two different frequencies into the detection zone and the tag reflects a signal having a frequency approximately midway between the two transmitted frequencies. The intermodulation characteristics of the two frequencies are said to enable the Stephen device to detect not only tag presence but also tag position within the zone. However, this marker tag detection system suffers from the same drawbacks as discussed with reference to Giles, above.

A surveillance system for detecting a security threat within a room is discussed in U.S. Pat. No. 4,382,291 to Nakauchi. Nakauchi transmits ultrasonic pulses into a room and then receives stores superposed digitized representations of the pulse reflections from objects and walls in the room. A "safe" reflected pattern is received and stored. Whenever "non-safe" objects or persons are within the room, the new reflected signature pattern is compared with the "safe" pattern and an alarm is generated if they do not match. However, such a system may suffer severe problems of false alarming. If any object in the room is caused to move, the system may generate an alarm. In addition, the presence of pets, insects, open windows (air circulation and/or blowing curtains) may also cause a false alarm.

Another alarm system for a room is described in U.S. Pat. No. 4,092,636 to Shepherd, Jr. In Shepherd, Jr., a microwave generator provides a directional beam to a microwave reflector mounted on a window or other vertical surface within the room. The beam is reflected back to the detector along a line-of-sight normal to the reflector. When the reflector is raised, broken, or altered in any way, or when the reflected beam is broken, an alarm is generated. Such a system may be limited in that a separate microwave generator appears to be provided for each reflector. In addition, this system may also be subject to false alarming. Vibration or movement of the reflector, the presence of pets or insects in the room, or blowing curtains may, for example, initiate a false alarm.

Some examples of further possibly relevant prior systems can be found in:

U.S. Pat. No. 3,518,546—Augenblick et al (1970)
U.S. Pat. No. 3,938,125—Benassi (1976)
U.S. Pat. No. 3,990,065—Purinton et al (1976)
U.S. Pat. No. 4,139,844—Reeder (1979)
U.S. Pat. No. 4,303,910—McCann (1981)
U.S. Pat. No. 4,334,214—Satou et al (1982)
U.S. Pat. No. 4,352,098—Stephen et al (1982)

From the above discussion, it is apparent that there is a continuing need for an inexpensive area security detection system that has a high probability of intruder detection, minimum false alarm probability, and which cannot be easily circumvented.

SUMMARY OF THE INVENTION

The present invention provides a microwave/seismic security apparatus and method in which transponded (e.g. reflected), frequency doubled microwave signals (reflected from a passive antenna/filter/diode circuit) are detected and correlated in phase and amplitude with an expected spectral signature. A local seismic sensor is also provided in the detection zone and provides seismic signals having a spectral "signature" related to certain types of motion disturbances (e.g. non-human types and human types). The seismic signals may be provided along with the detected microwave signals to a common digital signal processor which compares and correlates the reflected microwave signal and the seismic signal spectra with predetermined spectral patterns stored in memory. When both the correlated signals simultaneously indicate an intrusion, an alarm signal is generated. Thus, alarms are generated only when two separate types of sensors both detect abnormal conditions within the security zone. This dual sensor configuration greatly reduces false alarms within the system. The alarm may be generated whenever the correlated signal and the seismic signals match a known "non-safe" pattern, or when they fail to match a known "safe" pattern.

The transmitting/receiving microwave antenna at the central interrogation site may be provided in a conventional microstrip array configuration in which a narrow pencil or other type beam pattern is manually or electronically steered to a desired reflector location. Thus, a system having a plurality of reflectors spaced about the room may be provided, with the transmitted beam being steered successively to each reflector. Thus, one transmitter may serve to sweep an entire area for security threats.

Alternatively (or additionally) where a plurality of reflectors are provided, each reflector (or subgroup of reflectors) may have a frequency passband which is different from other reflectors in the room. A sweep control may then be connected to a voltage controlled oscillator which drives the transmitter so that the transmitted signal is swept through a predetermined frequency range. Thus, the transmitter will sweep through the frequencies of all reflectors and the receiver will look for an expected plurality of different doubled frequencies. If the sweep control is also connected to (or controlled by) the digital signal processor, an identification for each reflector may be derived as will be appreciated. Thus, not only may the presence of a security threat be detected, but its location within the detection zone can also be determined.

The use of phase as well as amplitude information in detection of the transponded response may also provide an extra degree of effectiveness.

BRIEF DESCRIPTION OF THE DRAWINGS

The invention will be better understood by reference to the following detailed description of the presently preferred exemplary embodiment together with the attached drawings in which:

FIG. 4 is a simplified schematic flow chart of an exemplary controlling program for the digital signal processor of FIG. 1.

DETAILED DESCRIPTION OF THE PRESENTLY PREFERRED EXEMPLARY EMBODIMENT

The present invention provides microwave/seismic responsive security apparatus and method for detecting a security threat within a given zone. Frequency specific microwave RF reflectors, having no battery or other power source (and including a passive frequency doubler), are attached to windows and other objects requiring motion detection. A seismic detector is also provided in the area. A remotely located interrogator (e.g. a transmitter/receiver with suitable antennae and a digital signal processor combining the outputs of both the reflectors and the seismic sensor) scans each reflector which responds by doubling the frequency and re-radiating the doubled frequency signal to the interrogator—if the then existing interrogator frequency matches the specific reflector filter setting. Scanning of a selected single reflector (or subgroup) may be effected by frequency scanning (if each reflector is tuned to respond at a specific frequency) or by spatial selection (e.g. by using a microstrip phased array to appropriately point a shaped beam of interrogating microwave energy and/or to similarly point receiving antenna beam).

The interrogator (in the preferred embodiment) combines phase and amplitude information from each reflector with seismic sensor data. A frequency spectrum match against known security threats can be used to verify responses and to generate an alarm for positive matches. Alternatively, failure to match known secure spectra can be used to trigger an alarm.

Figure 1:
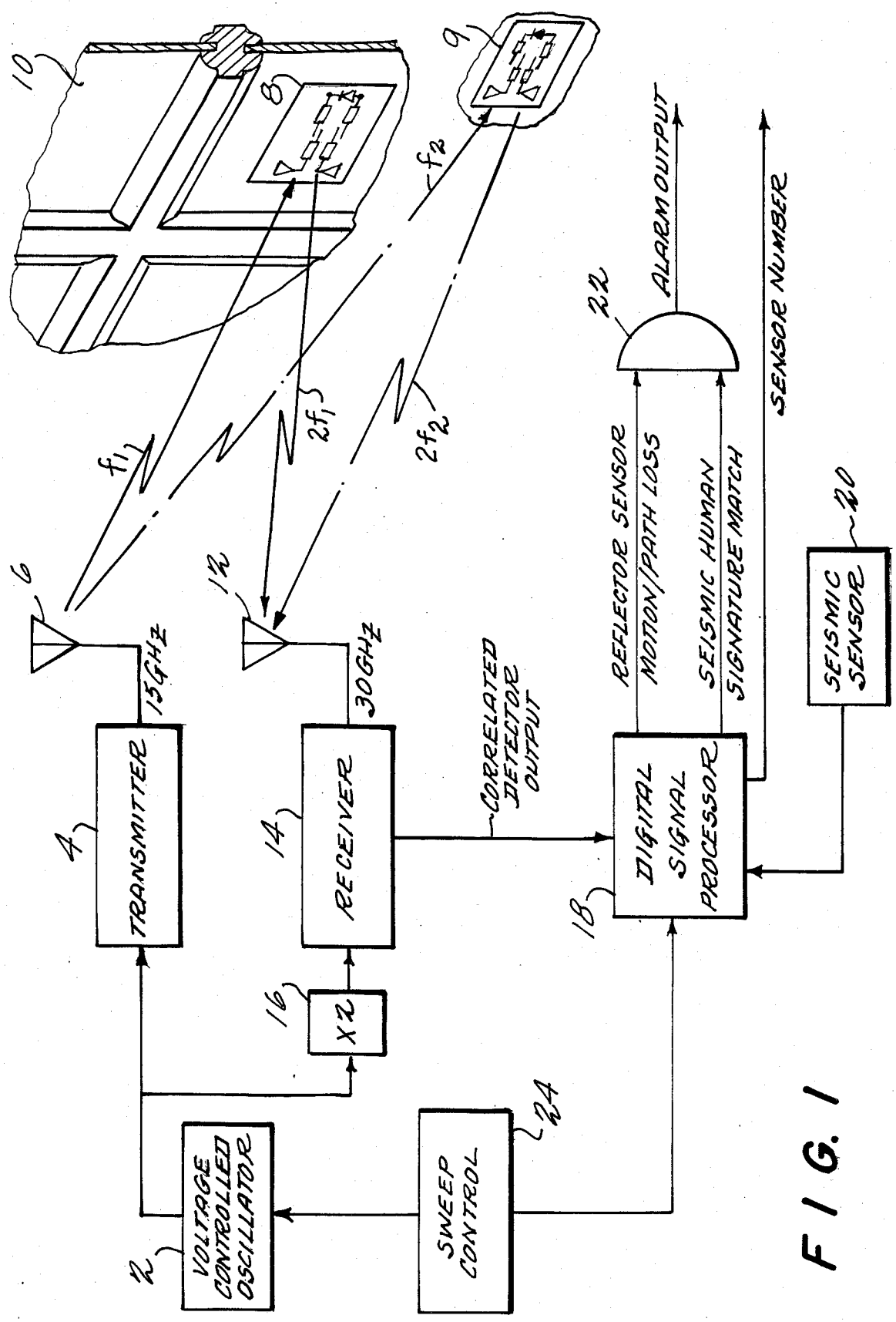
FIG. 1 is a system block diagram of a presently preferred exemplary embodiment of the present invention.

A description of the apparatus and method according to the presently preferred exemplary embodiment will now be provided with reference to FIG. 1. Voltage controlled oscillator 2 generates a signal having a first frequency signal driving transmitter 4 to radiate an interrogating microwave signal (e.g. 15 GHz). The output of antenna 6 may be directionally steered toward the proper location of reflector 8 using conventional beam steering techniques. In the preferred embodiment, the frequency of the transmitted signal may be in the neighborhood of 15 GHz.

In order to provide directional steering of the transmitted beam, a directional beam antenna 6 may be mechanically adjusted in the direction of reflector 8 and then mechanically readjusted to other reflectors in a multi-reflector system. However, it is preferable (and typically less expensive) to provide a microstrip phased array of antennae which may be electronically steered to prestored coordinates of each of a plurality of reflectors in the multi-reflector system. Such an electronically steered microstrip phased array antenna would be space-efficient, and relatively inexpensive to build and maintain. Such a microstrip phased array could also be so easily camouflaged so that it would not be easily masked or circumvented. The provision of a steered array also allows reflectors in the multi-reflector system to be periodically moved to different locations (assuming, of course, that the new position coordinates are properly entered into the interrogator). Such periodic movement enhances security threat detection within the zone. The provision of a steered array also allows the sensors to be selectively interrogated by the system in any sequence most conducive to enhance security within the zone.

Reflector 8 may be provided on a window 10 or any other desired location within the zone. Such reflectors should preferably be provided on movable objects such as doors and windows so that the entrance of an intruder may readily be detected. However, the placement of reflector 8 can be varied to provide any desired configuration for the security zone.

Reflector 8 reflects the transmitted directional $f_1$ beam after doubling its frequency in a manner to be described later. The reflected $2f_1$ beam with doubled frequency is received by antenna 12 and has, for example, a frequency of 30 GHz. The reflected signal is then provided to receiver 14 where it is correlated with the transmitted signal. A second reflector 9 (e.g. located on a door in the room) may similarly be interrogated with a beam of microwave signals at frequency $f_2$ which is reflected at frequency $2f_2$ along a path to receiving antenna 12.

Frequency multiplier 16 is coupled to voltage controlled oscillator 2 so as to provide a phase-reference signal to receiver 14 (which reference signal therefore corresponds in phase to the transmitted signal but has a doubled frequency just as expected to be reflected back from reflectors 8 and 9). Receiver 14 then correlates the signal reflected from reflectors 8 and 9 in phase and amplitude (using conventional RF processing techniques) and a suitable data output representing the received spectrum of phase and amplitude versus frequency which data then is provided to digital signal processor 18 (appropriate analog-to-digital conversion circuits may be included either in receiver 14 or the processor 18 as will be appreciated).

Digital signal processor 18 compares the reflected phase and amplitude data with a stored predetermined frequency spectrum or "signature" for such data. This frequency spectrum signature" is typically intruder motion specific and may be changed via solid state memory chips (ROMs) or through software changes to RAM, to match various specific security threats. The predetermined patterns may match known "non-safe" signatures or known "safe" signatures.

Digital signal processor 18 also receives input from at least one seismic sensor 20 which detects seismic disturbances within the security zone. Seismic signals corresponding to the seismic disturbances are also compared to predetermined spectral patterns of known "safe" or known "non-safe" patterns.

Digital signal processor 18 then outputs appropriate signals to AND gate 22 when either (a) the correlated signal or (b) the seismic signals indicate a security threat within the zone. AND gate 22 then outputs an alarm signal whenever both the correlated signal and the seismic sensor indicate a security threat within the zone. (Although AND gate 22 is shown in FIG. 1, it should be apparent that the logic function could also be accomplished within processor 18 if suitable control programs are utilized.)

Digital signal processor 18 may also indicate a potential security threat input to AND gate 22 whenever the correlated signal is not received or whenever the correlated signal is received at a reduced signal strength, indicating movement of the reflector or an object obstructing the beam path.

In a multi-reflector system, sweep control 24 may be provided to sweep the frequency of the signals provided by VCO 2 (e.g. in a sawtooth ramp fashion). Thus, each reflector in the multi-reflector system may have a passband with a different frequency and the transmitter may broadcast a swept non-directional signal having particular transient frequency components which will only be reflected by the passband of one or more particular reflectors. A time-base signal from sweep control 24 may also be provided to digital signal processor 18 as a suitable reference as should now be appreciated. Alternatively (or in addition) a spatial reflector locating scheme may be used by making antennae 6, 12 directional and by suitably controlling their respective pointing angles. Thus, a sensor identification output may be generated by digital signal processor 18 for each specific reflector. Thus, not only may the presence of a security threat within the zone be detected, but also its location.

Figure 2:
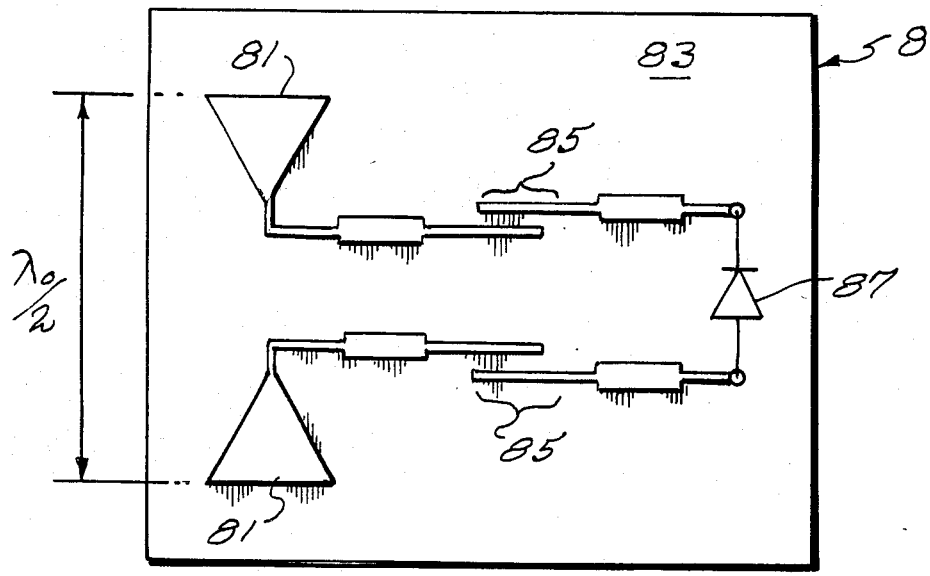
FIG. 2 is a more detailed plan view of an exemplary reflector/sensor for the system of FIG. 1.

A description of an exemplary reflector sensor 8 will now be provided with reference to FIG. 2. The reflector sensor may be conveniently provided using conventional "printed circuit" techniques (e.g. as used to make microstrip antennae). Such a reflector offers reduced size and an inexpensive reflector system. Preferably, a copper printed circuit dipole antenna 81 is etched on a dielectric substrate 83. The substrate typically could be mylar, Teflon (registered Trademark), fiberglass, or other known low-loss RF dielectric materials.

Also etched on the substrate is a narrow band filter 85 having a bandpass response encompassing the transmitted frequency $f_0$ and double the transmitted frequency $2f_0$. Those having skill in this field will readily understand that the narrow band filter (e.g. a series L-C resonant circuit) may be provided with a passband at $f_0$ (and at harmonics thereof, such as $2f_0$) which may be adjusted during manufacture to any one of several specific frequencies within the operational frequency band of the interrogating transmitter. Thus, multi-reflector systems may be easily and inexpensively provided.

A passive non-linear element such as RF diode 87 is attached to the filter output and is used to double the received frequency. Those having skill in this art will realize that other RF circuitry may be provided which operates on the received frequency to provide a signal having a frequency which is mathematically related to the received frequency.

The doubled frequency is then passed back through the filter 85 and is re-radiated by the dipole radiator 81. The entire reflector can be made quite small. For example, at a frequency of 15 GHz, the substrate may be approximately 1 inch square. Multiple dipoles could be arrayed on the substrate to increase the sensitivity (gain) of the reflector. Preferably, the distance between the extremities of the dipoles 81 is adjusted to be about one-half the wavelength of the transmitted signal at frequency $f_0$.

Reflector 8 only responds when the signal from transmitter 4 matches the passband frequency $f_0$ of the reflector. Thus, each reflector 8 remains silent until its particular passband frequency is provided by the interrogator transmitter.

Figure 3:
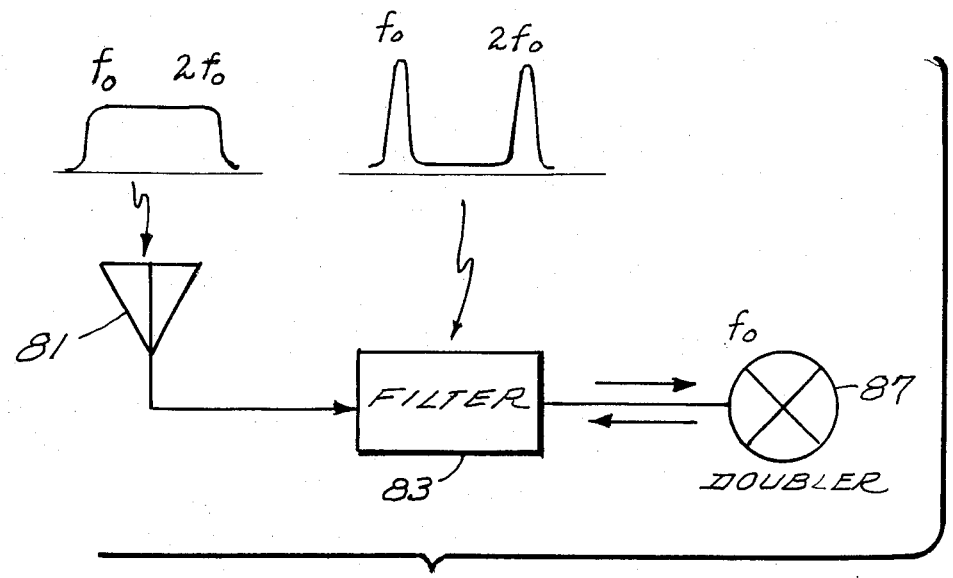
FIG. 3 is a schematic block diagram of the reflector sensor and exemplary depictions of the frequency spectra involved therein.

FIG. 3 depicts the frequency spectrum of the signals processed by reflector sensor 8. Antenna 81 receives and transmits signals within a band encompassing at least frequency $f_0$ through $2f_0$. Filter 83 receives this signal and passes only signals of frequency $f_0$ and $2f_0$. The transmitted signal of frequency $f_0$ is passed from filter 83 to doubler 87. The signal frequency is doubled to $2f_0$ and then reflected back to filter 83. The $2f_0$ signal is then re-radiated by antenna 81 to interrogator receiver antenna 12.

What has been described is a method and apparatus which provides an inexpensive security detection system which is not easily subject to false alarm or circumvention. The dual-sensor system provides a low false alarm rate while still providing an alarm even if any one sensor is somehow masked. Phased array transmitting antennas and printed circuit reflectors provide an inexpensive system which is easy to install and maintain.

In view of the above description, it should be apparent that digital signal processor 18 (e.g. a conventional microprocessor) may be suitably programmed in many ways to realize this invention. One example of a suitable program is shown in the abbreviated flow chart of FIG. 4. Here, upon entry to the monitor mode at 400, any desired initialization is performed at 402 (e.g. including the setting of counter N=1). The transmitted frequency is read at 404 (so as to identify which reflector 8 is being interrogated). Alternatively, the transmitter here could be actively driven at a known frequency and/or spatial direction to interogate a specific reflector 8 (or a specific group thereof).

A check is made at 406 for the presence of the expected double frequency response (assuming of course, that an appropriate countrol is effected to insure that the transmitter actually is currently attempting to interrogate at least one reflector in the system). If no response is detected, then one of the AND gate 22 inputs is immediately set at 412. Otherwise, the response phase and amplitude spectra are read at 408 and compared with pre-stored known security threat spectra at 410 (suitable match tolerances would be permitted as will be appreciated). If a match is found, then the reflector input to AND gate 22 is set at 412.

If the reflector input to AND gate 22 is set at 412, then a comparison of the current seismic sensor spectrum with known threat spectra is made at 414. If a match is found, then the seismic input to AND gate 22 is also set at 418 to result in an alarm output. Otherwise (and also in the event no known threat match is discovered at 410), the reflector sensor output for reflector N is reset at 416 and (an optional) check may be made at 420 for current spectra matching known safe critera. If not found, then AND gate 22 may be enabled at 422 to provide an alarm. Control is passed from the safe spectra match steps 420, 422—or directly if the safe spectra match feature is not used—to a check for a maximum N value at 424. If not yet at the maximum value, N is incremented at 426 and if it is at the maximum, then N is reset at 428 and control is pased back to the top of the monitoring loop at 404.

While the present invention has been explained in connection with what is presently considered to be the most practical and preferred embodiments, those having ordinary skill in this art will understand that modifications may be made while yet retaining many of the novel features and advantages of this invention. All such alternative embodiments are to be considered as within the scope of the appended claims.

What is claimed is:

1. A microwave/seismic security system comprising:
   at least one microwave RF signal reflector;
   at least one microwave RF signal interrogation means for transmitting microwave RF signals to said reflector and for receiving microwave signals reflected therefrom;
   at least one seismic signal sensor; and
   signal processing means conntected (a) to said interrogation means and (b) to said seismic signal sensor for generating an alarm in response to a predetermined relationship between expected microwave reflections and detected seismic signals.

2. A microwave/seismic security system as in claim 1 comprising a plurality of said microwave RF signal reflectors, at least one of which reflects microwave RF signals of a frequency different from those reflected from another one of the reflectors.

3. A microwave/seismic security system as in claim 1 or 2 wherein each of said RF signal reflectors comprises:
   an antenna;
   a bandpass filter connected to the antenna; and
   a passive frequency doubling means connected to said bandpass filter.

4. A microwave/seismic security system as in claim 3 wherein said antenna and said bandpass filter comprise a printed circuit of conductive material disposed on a dielectric substrate and wherein said frequency doubling means comprises a diode.

5. A microwave/seismic security system as in claim 1 wherein said interrogation means comprises means for repetitively transmitting RF signals at a succession of different frequencies.

6. A microwave/seismic security system as in claim 1 or 2 wherein said interrogation means comprises at least one microstrip phased array antenna for selectively transmitting and/or receiving microwave RF signals in different orientations so as to spatially select and interrogate a predetermined one or more of said reflectors when disposed at a predetermined location.

7. A microwave/seismic security system as in claim 1 or 2 wherein said signal processing means is adapted to provide an alarm output in response to simultaneous detection of:
   (a) a total loss of expected RF reflection signal or reception of an RF reflection signal indicative of a changed and potentially threatening condition; and
   (b) a seismic signal indicative of a potentially threatening condition.

8. A microwave/seismic security system as in claim 7 wherein said signal processing means is adapted to provide an alarm output when phase and amplitude spectra of the reflected RF signal and the spectrum of the seismic signal fail to match predetermined sprectral signals.

9. A microwave/seismic security system as in claim 7 wherein said signal processing means is adapted to provide an alarm output when phase and amplitude spectra of the reflected RF signal and the spectrum of the seismic signal match predetermined spectral signals.

10. A microwave/seismic security system as in claim 7 wherein said signal processing means is adapted to monitor the reflected signals from each of plural reflectors and to provide different alarm outputs corresponding to the condition of the different reflectors.

11. A microwave/seismic security detecting method comprising the steps of:
    transmitting microwave RF signals to at least one reflector and receiving microwave signals reflected therefrom;
    generating seismic signals; and
    generating an alarm in response to a predetermined relationship between .expected reflections of said microwave signals and detected seismic signals.

12. A microwave/seismic security detecting method as in claim 11 utilizing a plurality of microwave RF signal reflectors, at least one of which reflects microwave RF signals of a frequency different from those reflected from another one of the reflectors.

13. A microwave/seismic security detecting method as in claim 12 wherein said transmitting step comprises repetitively transmitting RF signals at a succession of different frequencies.

14. A microwave/seismic security detecting method as in claim 11 or 12 wherein said transmitting and receiving step comprises transmitting and/or receiving microwave RF signals in different orientations so as to spatially select and interrogate a predetermined one or more of said reflectors disposed at predetermined locations.

15. A microwave/seismic security detecting method as in claim 11 or 12 wherein said alarm is generated in response to simultaneous detection of:
    (a) a total loss of expected RF reflection signal or reception of an RF reflection signal indicative of a changed and potentially threatening condition; and
    (b) a seismic signal indicative of a potentially threatening condition.

16. A microwave/seismic security detecting method as in claim 15 wherein said alarm is generated when phase and amplitude spectra of the reflected RF signal and the spectrum of the seismic signal fail to match predetermined spectral signals.

17. A microwave/seismic security detecting method as in claim 15 wherein said alarm is generated when phase and amplitude spectra of the reflected RF signal and the spectrum of the seismic signal match predetermined spectral signals.

18. A microwave/seismic security detecting as in claim 15 further comprising monitoring the reflected signals from each of plural reflectors and providing different alarm outputs corresponding to the condition of the different reflectors.

19. A method for detecting security threats within a zone, said method comprising the steps of:
- transmitting a first RF signal of frequency $f_0$;
- receiving and reflecting, at a predetermined location within said zone, said first signal at a second frequency which is harmonically related to said first frequency;
- receiving said reflected signal and correlating it with the expected reflection signal to provide correlated signals;
- detecting seismic events in said zone and producing corresponding seismic signals
- comparing said seismic signals and said correlated signals with predetermined stored signal patterns; and
- providing a security threat signal when both said correlated signal and said seismic signals have a predetermined relationship with said predetermined patterns.

20. Apparatus for detecting security threats in a zone, comprising:
- means for transmitting an RF signal having a first frequency;
- means for receiving and reflecting said RF signal to provide a reflected signal having a second frequency which is harmonically related to said first frequency;
- means for receiving said reflected signal and correlating it with said transmitted signal to provide correlated signals;
- means for detecting seismic events in said zone and providing seismic signals
- means for receiving said seismic signals and said correlated signals and comparing them with predetermined signal patterns; and
- means for providing a security threat signal when both said correlated signals and said seismic signals have a predetermined relationship with said predetermined signal patterns.

21. Apparatus for detecting a security threat in a zone comprising:
- means for generating an RF signal having at least a first frequency;
- means for transmitting said signal in at least a first direction;
- means for receiving said transmitted signal, and retransmitting a second signal at a second frequency;
- means for receiving said retransmitted signal and correlating it in phase and amplitude with said transmitted signal to provide a correlated signal;
- means for detecting seismic disturbances in said zone, and providing seismic signals related to said disturbances;
- means for receiving said correlated signal and said seismic signals, and comparing them with predetermined signal patterns; and
- means for providing a security threat signal when said correlated signal and said seismic signals are in a predetermined relationship with said predetermined patterns.

22. Apparatus according to claim 21 wherein said means for generating includes means for sweeping the frequency of said generated signal.

23. Apparatus according to claim 22 wherein said means for receiving and retransmitting includes a passive reflector having filter means which pass said first frequency and a multiple of said first frequency.

24. Apparatus according to claim 21 including a plurality of reflectors with at least one reflector having filter means which pass frequencies different from at least one other reflector filter means.

25. Apparatus according to claim 21 wherein said means for transmitting includes a steerable array of antennae.

* * * * *